April 14, 1964     F. A. DEXTER     3,129,045
PATCH PANEL
Filed Dec. 22, 1961     3 Sheets-Sheet 1
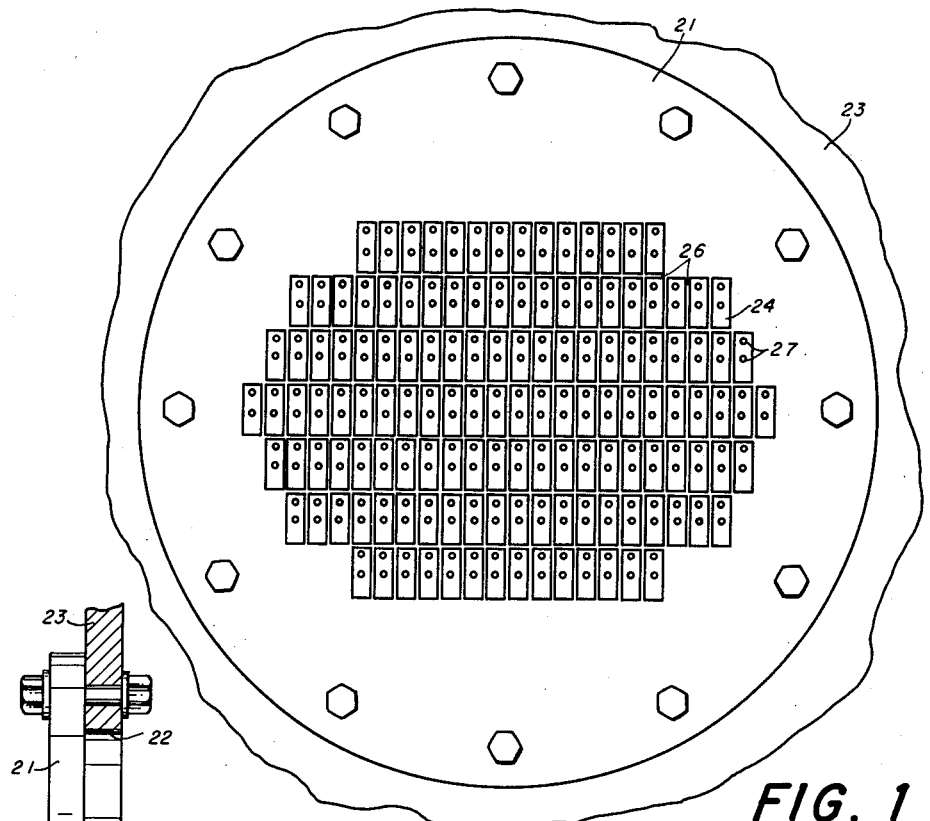
FIG. 1
FIG. 2
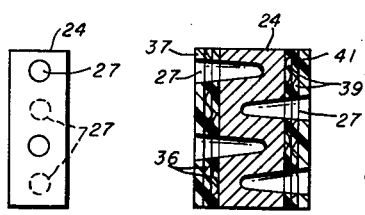
FIG. 12     FIG. 13
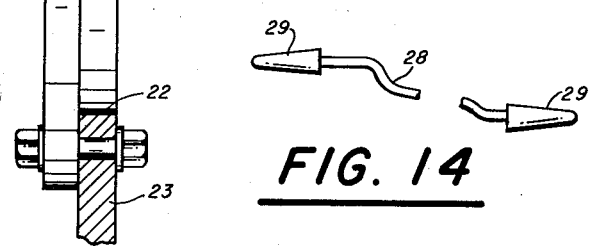
FIG. 14
INVENTOR.
FRED A. DEXTER
BY
ATTORNEYS April 14, 1964  F. A. DEXTER  3,129,045
PATCH PANEL Filed Dec. 22, 1961  3 Sheets-Sheet 2

INVENTOR.
FRED A. DEXTER
BY
ATTORNEYS

April 14, 1964 F. A. DEXTER 3,129,045
PATCH PANEL
Filed Dec. 22, 1961 3 Sheets-Sheet 3

INVENTOR.
FRED A. DEXTER
BY
ATTORNEYS

United States Patent Office 3,129,045
Patented Apr. 14, 1964

3,129,045
PATCH PANEL
Fred A. Dexter, 4715 Filipo St., San Diego 15, Calif.
Filed Dec. 22, 1961, Ser. No. 161,750
3 Claims. (Cl. 339—18)
(Granted under Title 35, U.S. Code (1952), sec. 266)

The invention described herein may be manufactured and used by or for the Government of the United States of America for governmental purposes without the payment of any royalties thereon or therefor.

This invention relates to patch boards generally. More specifically, it covers an air-tight bulkhead panel incorporating a patch board and the novel method for constructing it so that patch cords carrying 10 amperes or more may be employed and the panel be capable of withstanding pressure differentials of forty pounds or more per square inch.

Under present practice when cable runs are to be connected through pressure sealed bulkheads, various devices such as stuffing tubes are commonly used to provide air-tight integrity. If leaks should occur in the insulation at any point in the line where moisture is present, the moisture may be carried internally through several bulkhead stuffing tubes and along the various lengths of the cable, thus fouling up the entire circuit. Interconnection between stuffing tube connectors are difficult to make and consequently circuits remain connected in series or parallel as originally planned with no means to facilitate changes. In addition to aforesaid electronic disadvantages, physically most air-tight panels employ a through contact which protrudes from each face of the panel. The fact that such contacts are assembled or mounted on the panel by mechanical means in place of casting them as an integral part of it is a weakness in the design, causing the panel to fail in air-tight integrity as a result of accidentally knocking the protruding contacts.

The general object of the proposed invention is to provide a patch panel eliminating the aforesaid disadvantages and to disclose a novel method for making the panel.

Primarily, the objects of this invention are to provide an air-tight patch panel for sealing an aperture in a bulkhead or pressurized compartment partition; to provide patching wherein series and parallel circuits may be set up or changed without breaking the air-tight integrity of the panel; to provide panel patch conductors of one piece of material extending through and integrally cast into the panel, and provide two or more electrical patch sockets in each panel face of the conductors whereby matching sockets on opposite faces do not interconnect and are flush with the panel surface.

Another object is to provide a simple method for machining the plurality of patches from a solid piece of stock and retaining them connected in their correct interrelated positions while casting them into a dielectric panel to form an integral part thereof before disconnecting the patches electrically to complete the panel.

The objects of the invention and what it accomplishes, are more fully described in the following specification, pointed out in the claims, and illustrated in the accompanying drawings in which:

FIG. 1 is a front elevation of the proposed patch panel mounted in a bulkhead aperture;

FIG. 2 is a side elevation of the same partially in section;

FIG. 12 is an enlarged front elevation of a single conductor patch block with the terminal sockets in place;

FIG. 13 is an enlarged side elevation in section of a conductor patch block along its center line, and showing the fiber glass and resin layers added; and FIG. 14 is a patch cord with terminals attached.

Figure 3:
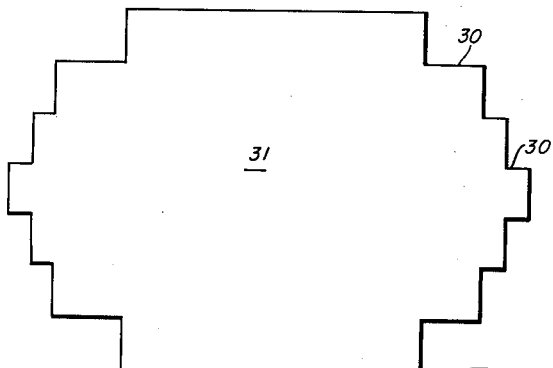
FIG. 3 is a front elevational view of the stock blank from which the patches are machined.
Figure 4:
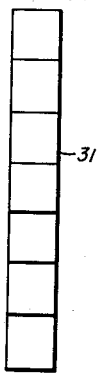
FIG. 4 is a side elevation of FIG. 3.

In detail, FIG. 1 is a front elevation of the complete air-tight electrical patch panel for sealing a bulkhead aperture designed to withstand high differential pressures. The panel 21 may be made of any moldable dielectric material having sufficient strength to withstand the differential pressure. The preferred dielectric is an epoxy resin in which the conductor patches 24 are incorporated as an integral part of the panel during casting. The panel 21 is shown closing the aperture 22 FIG. 2 of bulkhead 23 and held by bolts or any suitable means. The parallel spaces 26 between the patches is filled with the panel dielectric.

Each patch block 24 is provided with one or more terminal sockets 27 in each panel face for patching through the panel by employing patch cords 28 FIG. 14 equipped with terminal plugs 29 designed to conform to and be gripped by sockets 27. By referring to FIG. 13 the sockets extend into the patch block 24 beyond the half way point but are axially offset to prevent intercommunication so that air-tight integrity is maintained. By providing two or more sockets 27 in each patch face FIG. 13, interconnections can be established by patch cords 28 whereby one or several patches can be connected in series or parallel to facilitate patching in any selected manner.

The novel method for manufacturing the proposed patch panel in order to produce a panel capable of withstanding the differential pressures and at the same time provide accuracy of positioning the plurality of patches, is also important from an economic standpoint. In a preliminary layout, the size of the patch blanks is determined in order to provide sufficient stock for housing the sockets 27 and conductive material to carry the heavy current. The required spacing of the patches 24 will depend mainly on the dielectric factors of the material cast into the separations or grooves 32 and 33.

Figure 5:
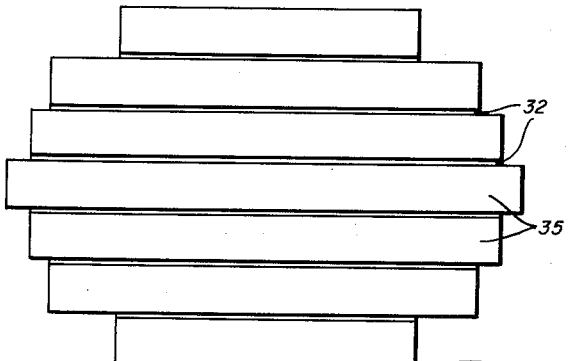
FIG. 5 is a front elevation of the stock blank of FIG. 3 with the parallel horizontal saw cuts machined therein.
Figure 6:
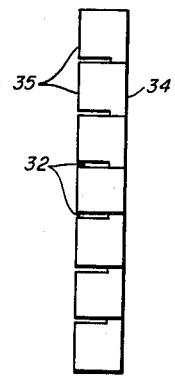
FIG. 6 is a side elevation of FIG. 5.

The preferred method steps comprise first making up a conductor blank 31 FIG. 3 of any desired metal. The steps 30 are layed out so that the groove cuts will have one side of either the horizontal grooves 32 or vertical grooves 33 coincide with the riser or tread of said steps. The series of parallel horizontal grooves 32 are then machined into the blank 31 by a gang saw or any suitable tool. This produces the blank form as illustrated in FIGS. 5 and 6 wherein it will be noted that a base 34 below the bottom of the grooves 32 remains to retain the patch blank strips 35 in correct relative position. It is to be noted at this point in the method, a series of separate brass strips may be employed and mechanically held in their correct relative position and substituted for the solid blank 31 and the aforesaid preliminary step but the substitution would be less efficient.

Figure 7:
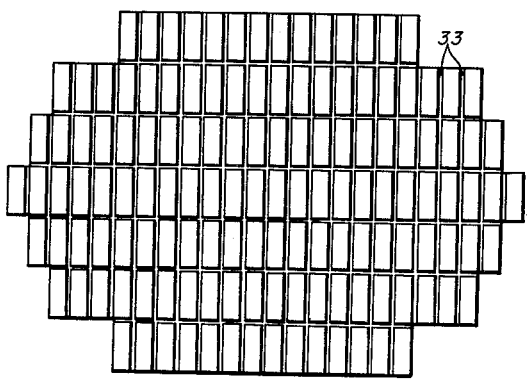
FIG. 7 is a front elevation of the stock blank shown in FIG. 5 with the parallel vertical saw cuts added.
Figure 8:
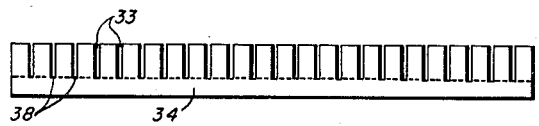
FIG. 8 is a side elevation of FIG. 7.

The next step is to machine the vertical grooves 33 at right angles to the horizontal grooves, as illustrated in FIGS. 7 and 8. This machining step is similar to the one for producing horizontal grooves 32, and leaves the patches attached to the base stocks 34 along line 38 FIG. 8.

Figure 9:
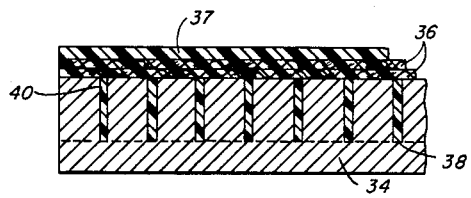
FIG. 9 is an enlarged side elevation in section of a portion of FIG. 7 showing fiber glass and epoxy resin cast in place.

The next step is to cast the dielectric panel thus incorporating the patches in the panel in the same operation. The circular panel 21 FIG. 1 is cast in a circular form with the machined patch blank FIG. 8 centrally positioned in said circular form. The first step in the casting is to cover the top of the patch blanks with one or more layers of fiber glass cloth 36. Then the dielectric, preferably epoxy resin is poured over the fiber glass cloth 36 until the horizontal and vertical grooves 32 and 33 are filled with the resin 37 and a layer above the cloth 36 is built up as illustrated in FIG. 9. Air pockets in the epoxy resin may be removed by vacuum.

Figure 10:
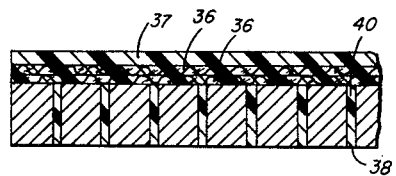
FIG. 10 is a view of the panel as shown in FIG. 9 with the bottom face machined away.

After allowing the resin to harden, the base stock 34 of the patch blank FIG. 9 is then removed by facing the blank to the bottom line 38 of the grooves 32 and 33 which segregates the patches 24 from the conductor blank 31 but at the same time incorporates them as an integrated part of the dielectric panel FIG. 10.

Figure 11:
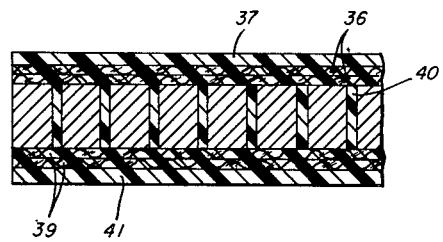
FIG. 11 is similar to FIG. 10 with fiber glass and epoxy resin cast on the bottom face.

The next step is to turn the panel over and after covering the surface 38 with one or more layers of fiber glass 39, to cast epoxy resin over the fiber glass and build up the dielectric surface 41 FIG. 11.

The next and final step in the process is the layout and machining of the terminal sockets 27 in the upper and lower faces of each patch blank. By referring to FIGS. 12 and 13 it is apparent that the terminal sockets 27 are machined more than half way through the patch blank stock to provide a sufficient contact bearing surface for the terminals 29. In order to conserve materials and keep the panel light and thin the matching sockets 27 on opposite faces of panel are located out of alignment respectively so that no interconnection or break through occurs which would break down the air-tight integrity of the panel.

Having described my invention, what I claim is:

1. An air-tight electrical patch panel for use with a bulkhead provided with an aperture and adapted for separating high differential pressures, said panel comprising:

an integrally-cast body portion formed of a moldable dielectric material sized and shaped to sealably engage said aperture;

means for removably securing said body portion to said bulkhead, a plurality of spaced-apart rectangular conductive-metal patch inserts arranged side-by-side in a parallel arrangement in said body portion with said integral body portion material filling the spaces between said inserts, the inserts having their outwardly-oriented face portions each disposed in a plane and said integrally cast body portion material also providing a continuous covering for one side of the panel whereby the outwardly oriented insert faces on said one side of the panel are completely covered by said integrally cast material, a layer of moldable dielectric material covering the opposite faces of said inserts, said panel being provided with terminal socket openings extending from both its face portions interiorly into each of said inserts, and each insert having at least two sockets on each of its faces and the sockets of one face being staggered relative to the sockets of the opposite face for permitting a minimizing of the patch panel thickness, each of said insert sockets projecting inwardly a distance greater than one-half the width of its insert and being closed at its inner end, and each of said insert sockets being aligned with a panel socket for receiving a terminal plug.

2. The patch panel of claim 1 wherein said moldable materials are formed of an epoxy resin and the epoxy resin material covering each face portion of the panel includes layers of fiber glass embedded therein.

3. The patch panel of claim 1 wherein the spacing between said insert patches is reduced to a minimum consistent with providing effective electrical insulation.

References Cited in the file of this patent

UNITED STATES PATENTS

| | | |
|---|---|---|
| 972,956 | Ward | Oct. 18, 1910 |
| 2,056,361 | Mills | Oct. 6, 1936 |
| 2,265,341 | Borchert | Dec. 9, 1941 |
| 2,286,812 | Keefe | June 16, 1942 |
| 2,379,226 | Frey | June 26, 1945 |
| 2,507,242 | Bost | May 9, 1950 |
| 2,552,028 | Blair | May 8, 1951 |
| 2,849,699 | Demurjian | Aug. 26, 1958 |
| 2,861,324 | Klumpp | Nov. 25, 1958 |
| 2,874,313 | Githens | Feb. 17, 1959 |
| 2,952,828 | Dorizzi | Sept. 13, 1960 |
| 2,963,775 | Chadwick | Dec. 13, 1960 |

OTHER REFERENCES

Electrical Manufacturing, October 1957, pages 124–128. (Copy available in Scientific Libry.)

Electronic Design, Mar. 19, 1958, pages 120 and 121. (Copy available in Scientific Libry.)

IBM Technical Disclosure Bulletin, vol. 1, No. 2, August 1959. (Copy available in Div. 14.)